(12) United States Patent
Peng et al.

(10) Patent No.: US 8,248,706 B2
(45) Date of Patent: Aug. 21, 2012

(54) ZOOM LENS SYSTEM HAVING HIGH ZOOM RATIO AND SHORT OVERALL LENGTH

(75) Inventors: Fang-Ying Peng, Taipei Hsien (TW);
Hai-Jo Huang, Taipei Hsien (TW);
Sheng-An Wang, Taipei Hsien (TW);
Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 43 days.

(21) Appl. No.: 12/975,298

(22) Filed: Dec. 21, 2010

(65) Prior Publication Data
US 2012/0127585 A1    May 24, 2012

(30) Foreign Application Priority Data

Nov. 22, 2010   (CN) .......................... 2010 1 0553220

(51) Int. Cl.
*G02B 15/14* (2006.01)
(52) U.S. Cl. ...................................................... 359/687

(58) Field of Classification Search .................. 359/687, 359/683, 676
See application file for complete search history.

(56) References Cited

U.S. PATENT DOCUMENTS
7,558,001 B2   7/2009   Kim et al.
2011/0026134 A1*   2/2011   Sakai ............................ 359/687

FOREIGN PATENT DOCUMENTS
CN   101144900 A   3/2008
* cited by examiner

*Primary Examiner* — Scott J Sugarman
(74) *Attorney, Agent, or Firm* — Altis Law Group, Inc.

(57) ABSTRACT

A zoom lens system includes a first lens group with positive refractive power, a second lens group with negative refractive power, a third lens group with positive refractive power, and a fourth lens group with positive refractive power. The lens groups can move along the optical axis of the zoom lens system. The zoom lens system satisfies the formula: $0.15<|L3|/Lt<0.25$. $L3$ is a movement vector of the third lens group during the zoom lens system moves from a wide-angle state to a telephoto state. The movement vector is a positive value when the zoom lens system moves from a subject side to an image side thereof. The movement vector is a negative value when the zoom lens system moves from the image side to the subject side. $Lt$ is the total length of the zoom lens system along the optical axis in the telephoto state.

9 Claims, 14 Drawing Sheets

ZOOM LENS SYSTEM HAVING HIGH ZOOM RATIO AND SHORT OVERALL LENGTH

BACKGROUND

1. Technical Field

The present disclosure relates to lenses and, particularly, to a zoom lens system having a short overall length and a high zoom ratio.

2. Description of Related Art

In order to obtain small-sized camera modules for use in thin devices, such as mobile phones, personal digital assistant (PDA), or webcams that can still capture quality images, zoom lens systems with high zoom ratio but short overall length are desired. Factors affect both the zoom ratio and the overall length of the zoom lens system, such as, the number and position of lenses employed, the power distribution of the employed lenses, and the shape of each employed lens, complicates any attempts at increasing zoom ratios but shortening overall lengths of zoom lenses. For example, reducing the number of lenses can shorten the overall length of the zoom lens system, but zoom ratio will suffer, conversely, increasing the number of lenses can increase zoom ratio, but increases overall length of the zoom lens system.

Therefore, it is desirable to provide a zoom lens system which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
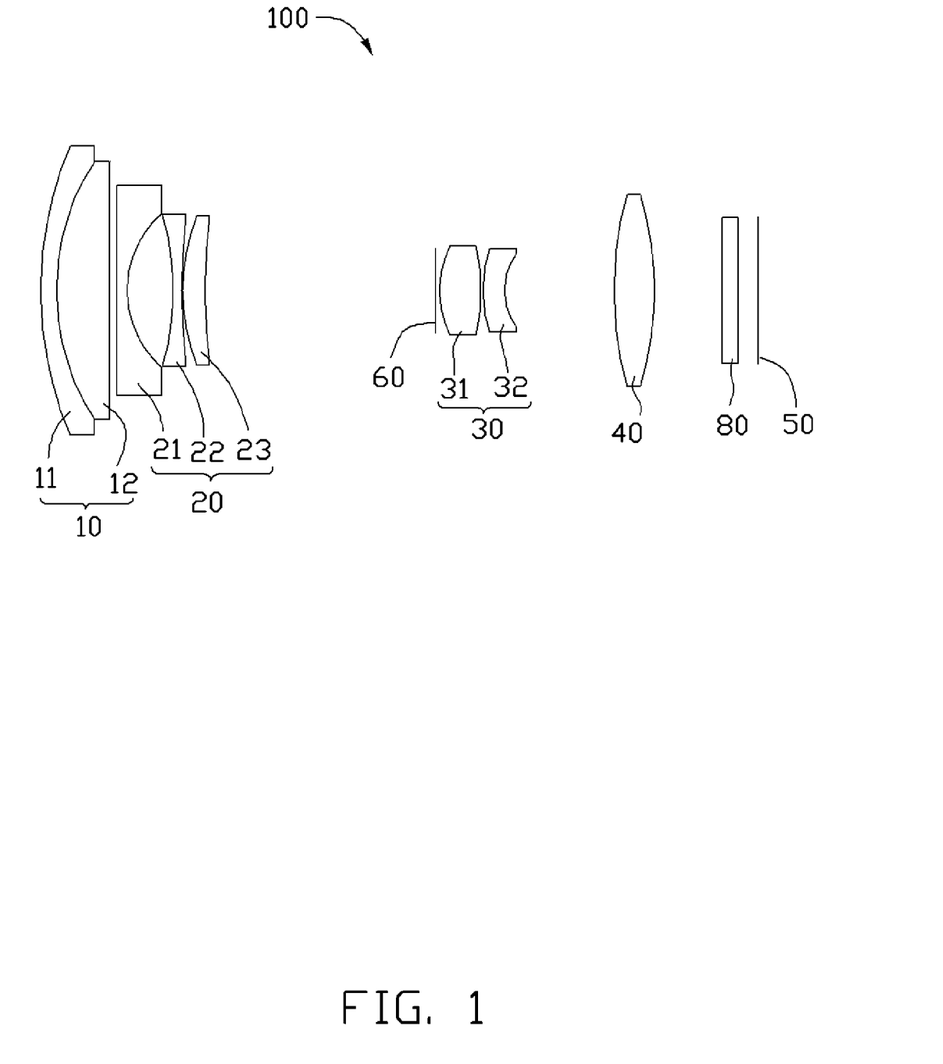
FIG. 1 is a schematic view of a zoom lens system in accordance with a first embodiment.

Referring to FIG. 1, a first embodiment of a zoom lens system 100 includes, in order from the subject to the image side thereof, a first lens group 10 of positive refractive power, a second lens group 20 of negative refractive power, a third lens group 30 of positive refractive power, a fourth lens group 40 of positive refractive power, and an image plane 50.

When capturing an image, incident light rays enter the zoom lens system 100, transmit through the four lens groups 10-40, and reach the image plane 50.

The four lens groups 10-40 are movably mounted. The effective focal length of the zoom lens system 100 can be adjusted by moving the lens groups 10, 20, 30, 40 along the optical axis thereof. In particular, the effective focal length of the zoom lens system 100 can be reduced by moving the lens groups 10, 20, 30, 40 to any point toward the image side of the zoom lens system 100 until they reach a maximum wide angle state. Conversely, the effective focal length of the zoom lens system 100 can be increased by moving the lens groups 10, 20, 30, 40 to any point toward the subject side of the zoom lens system 100 until they reach a maximum telephoto state.

The first lens group 10 includes, in order from the subject to the image side of the zoom lens system 100, a first lens 11 of negative refractive power and a second lens 12 of positive refractive power. The first lens 11 and the second lens 12 are adhered together to form a compound lens. The second lens group 20 includes, in order from the subject to the image side of the zoom lens system 100, a third lens 21 of negative refractive power, a fourth lens 22 of negative refractive power, and a fifth lens 23 of positive refractive power. The third lens group 30 includes, in order from the subject to the image side of the zoom lens system 100, a sixth lens 31 of positive refractive power and a seventh lens 32 of negative refractive power. The fourth lens group 40 includes an eighth lens of positive refractive power.

In practice, an aperture stop 60 can be interposed between the second lens group 20 and the third lens group 30 to limit the flux of light from the second lens group 20 to the third lens group 30, and thus the light cone of the light rays entering the third lens group 30 will more symmetric to control the coma occurring in the zoom lens system 100 within a correctable range. In this embodiment, the aperture stop 60 can move with the second lens group 20, and the diameter of the aperture stop 60 is unchangeable.

The zoom lens system 100 further includes an infrared cut filter 80 disposed on the subject side of the image plane 50.

The zoom lens system 100 satisfies a formula: $0.15<|L3|/Lt<0.25$, where L3 is a movement vector of the third lens group 30 corresponding to that the zoom lens system 100 moves from the wide angle state to the telephoto state. The movement vector of the third lens group 30 is a positive value when the third lens group 30 moves from the subject side to the image side. The movement vector of the third lens group 30 is a negative value when the third lens group 30 moves from the image side to the subject side, Lt is the total length of the zoom lens system 100 along the optical axis thereof in the telephoto state. Specifically, when $|L3|/Lt<0.25$ is not satisfied, the attempt of shortening the overall length of the zoom lens system 100 encounters a challenge, when $0.15<|L3|/Lt$ is not satisfied, the astigmatism occurring in the zoom lens system 100 of the telephoto state exceeds the correctable range. In this embodiment, L3=−14.394 mm, Lt=60.081 mm, $|L3|/Lt=0.240$.

To optimize the optical performance, the zoom lens system 100 further satisfies a formula: $0.15<f3/ft<0.2$, wherein f3 is the effective focal length of the third lens group 30, ft is the effective focal length of the zoom lens system 100 in the telephoto state. Specifically, when $f3/ft<0.2$ is not satisfied, the zoom lens system 100 in the wide angle state cannot receive the wide-angle light rays, and thus the diameter of the zoom lens system 100 will increase, the attempt of shortening the overall length of the zoom lens system 100 encounters a challenge; when $0.15<f3/ft$ is not satisfied, the chromatic aberration occurring in the zoom lens system 100 exceeds the correctable range. In this embodiment, f3=10.146 mm, ft=57.900 mm, f3/ft=0.175.

To reduce the thickness of the zoom lens system 100, the zoom lens system 100 further satisfies a formula: 7.2<(Lw×Lt)/(fw×ft)<7.8, where Lw is the overall length of the zoom lens system 100 in the wide angle state, fw is the effective focal length of the zoom lens system 100 in the wide angle state. In this embodiment, Lw=37.814 mm, Lt=60.081 mm, fw=5.144 mm, ft=57.900 mm, (Lw×Lt)/(fw×ft)=7.628.

A subject side surface of the second lens 12, a subject side surface and an image side surface of the sixth lens 31 are aspherical surfaces. The aspherical surfaces are shaped according to the formula:

$$x = \frac{ch^2}{1+\sqrt{1-(k+1)c^2h^2}} + \sum A_i h^i,$$

where h is a height from the optical axis of the zoom lens system 100 to the aspherical surface, c is a vertex curvature, k is a conic constant, and Ai are i-th order correction coefficients of the aspheric surface.

In the present embodiment, the following symbols are used:
F/No: F number;
2ω: field angle;
R: radius of curvature;
D: distance between surfaces on the optical axis of the zoom lens system 100;
Nd: refractive index of lens of d light (wavelength: 587.6 nm); and
Vd: Abbe number of d light (wavelength: 587.6 nm).

The zoom lens system 100 of the first embodiment satisfies the tables 1-4.

TABLE 1

| Surface | R(mm) | D(mm) | Nd | Vd |
| --- | --- | --- | --- | --- |
| Subject side surface of the first lens 11 | 19.487 | 0.842 | 2.001 | 29.1347 |
| Image side surface of the first lens 11 (Subject side surface of the second lens 12) | 12.723 | 2.788 | 1.6968 | 55.46 |
| Image side surface of the second lens 12 | −1683.17 | D3 | — | — |
| Subject side surface of the third lens 21 | −1068.026 | 0.536 | 1.741 | 52.6 |
| Image side surface of the third lens 21 | 5.482 | 2.4 | — | — |
| Subject side surface of the fourth lens 22 | −14.727 | 0.459 | 1.7015 | 41.149 |
| Image side surface of the fourth lens 22 | 34.619 | 0.05 | — | — |
| Subject side surface of the fifth lens 23 | 11.072 | 1.18 | 2.0027 | 19.317 |
| Image side surface of the fifth lens 23 | 27.746 | D9 | — | — |
| Aperture stop 60 | Infinity | 0.22 | — | — |
| Subject side surface of the sixth lens 31 | 4.966 | 2.14 | 1.592 | 67.0227 |
| Image side surface of the sixth lens 31 | −12.986 | 0.153 | — | — |
| Subject side surface of the seventh lens 32 | 7.004 | 1.138 | 1.808 | 22.76 |
| Image side surface of the seventh lens 32 | 3.47 | D14 | — | — |
| Subject side surface of the eighth lens | 19.053 | 2.133 | 1.6034 | 38.01 |
| Image side surface of the eighth lens | −17.485 | D16 | — | — |
| Subject side surface of the filter 80 | Infinity | 0.8 | 1.516 | 64.1 |
| Image side surface of the filter 80 | infinity | 1.1 | — | — |
| Image plane 50 | infinity | — | — | — |

TABLE 2

| Surface | Aspherical coefficient |
| --- | --- |
| Subject side surface of the second lens 12 | K = 0; A4 = 1.699225e−005; A6 = −2.29685e−006; A8 = 1.785986e−007; A10 = −7.80209e−009; A12 = 1.930773e−010; A14 = −2.52510e−012; A16 = 1.353609e−014 |
| Subject side surface of the sixth lens 31 | K = −0.246; A4 = −1.34104e−003; A6 = 3.464040e−005; A8 = −2.10306e−005; A10 = −8.18039e−006; A12 = 3.957986e−006; A14 = −6.40957e−007; A16 = 3.555485e−008 |
| Image side surface | K = −21.328; A4 = −1.19454e−003; |

TABLE 2-continued

| Surface | Aspherical coefficient |
| --- | --- |
| of the sixth lens 31 | A6 = −1.43096e−004; A8 = 8.356327e−005; A10 = −3.79679e−005; A12 = 9.098635e−006; A14 = −1.15937e−006; A16 = 5.950946e−008 |

TABLE 3

|  | D3 | D9 | D14 | D16 |
| --- | --- | --- | --- | --- |
| Wide angle state | 0.4 | 12.1256 | 5.755 | 3.6 |
| Telephoto state | 19.533 | 0.884 | 22.177 | 1.463 |

TABLE 4

|  | f(mm) | F/No | 2ω |
| --- | --- | --- | --- |
| Wide-angle state | 5.14 | 2.95 | 75 |
| Telephoto state | 57.9 | 6.1 | 7.6 |

Figure 2:
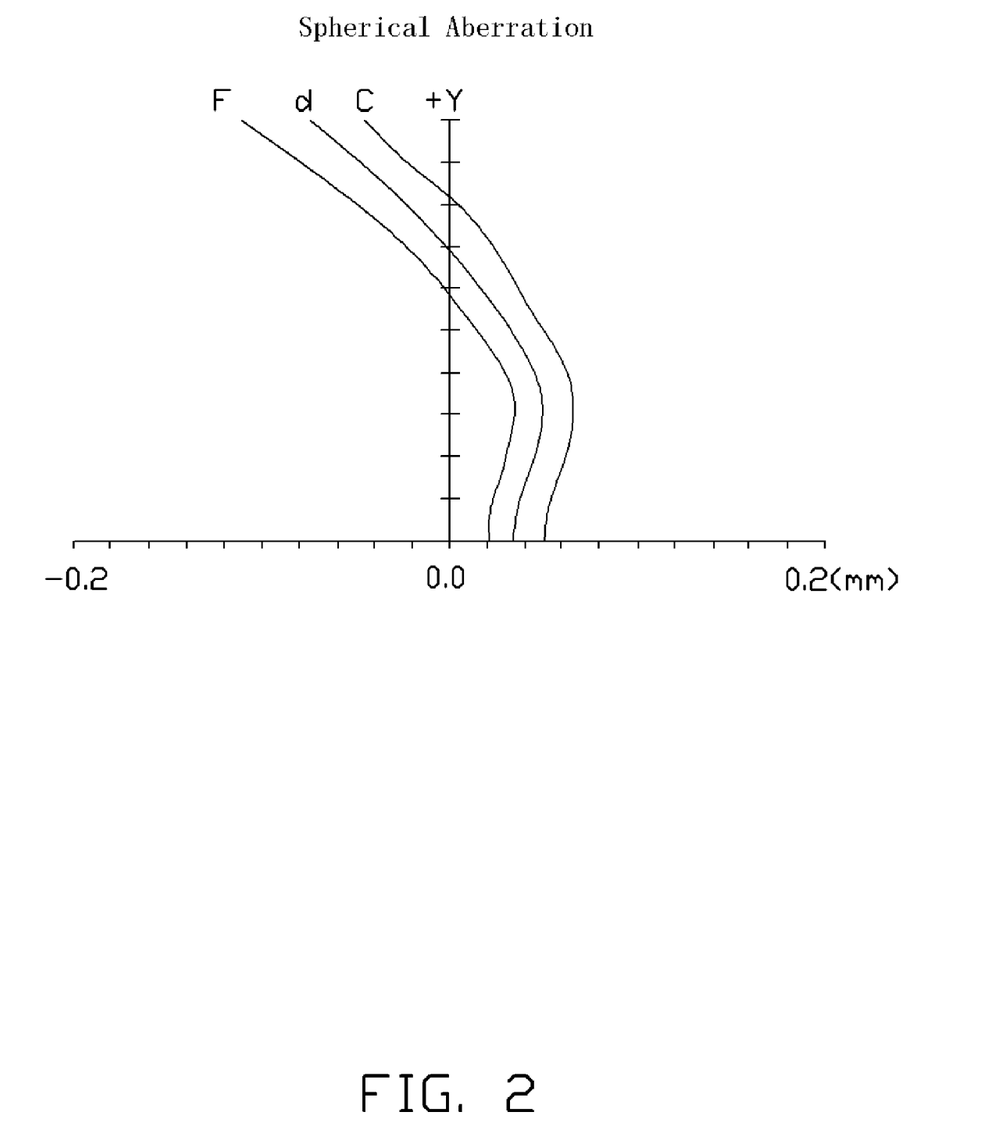
FIGS. 2-4 are graphs respectively showing spherical aberration, field curvature, and distortion in the zoom lens system of FIG. 1 in a wide angle state.
Figure 3:
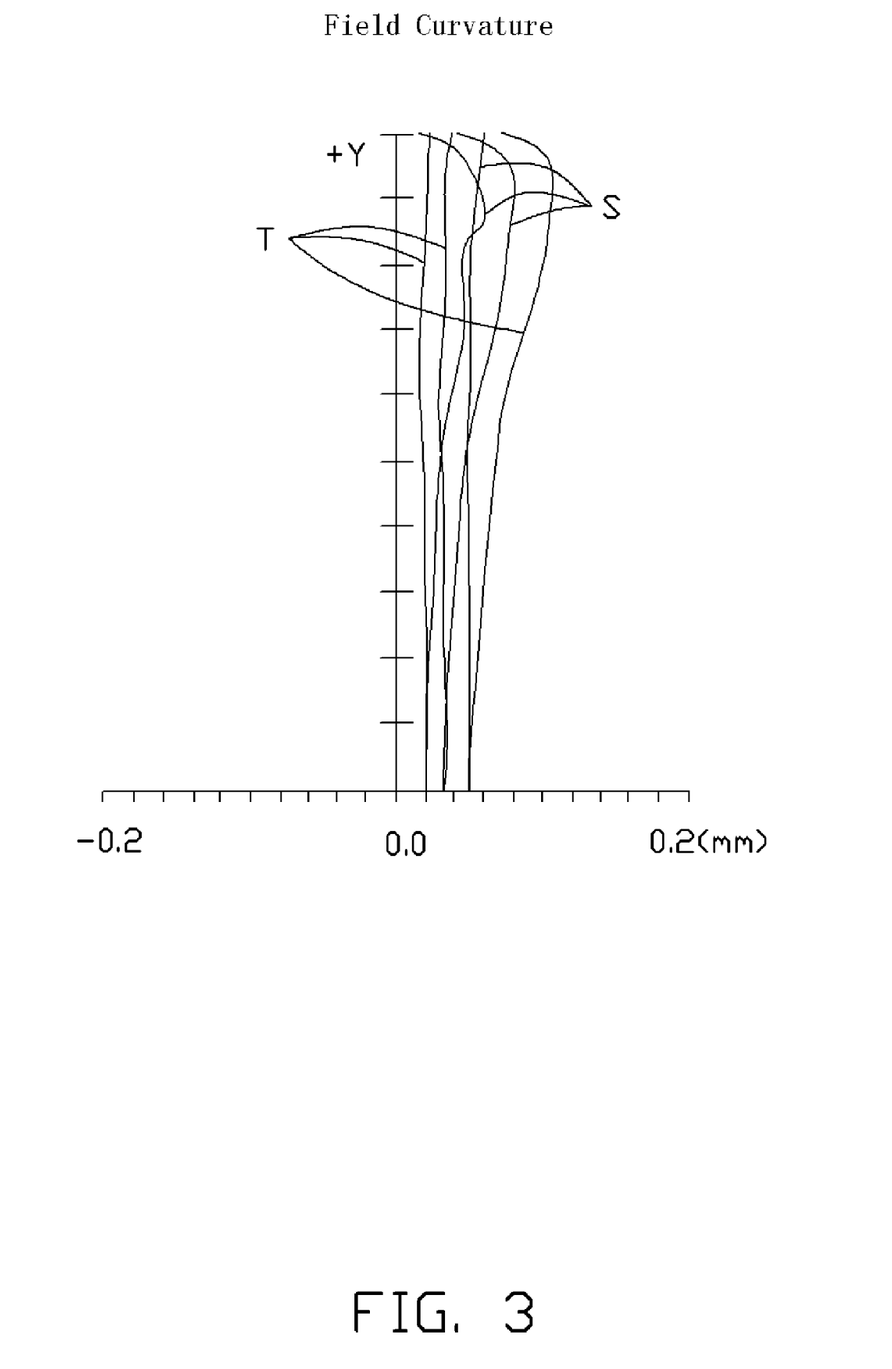
Figure 4:
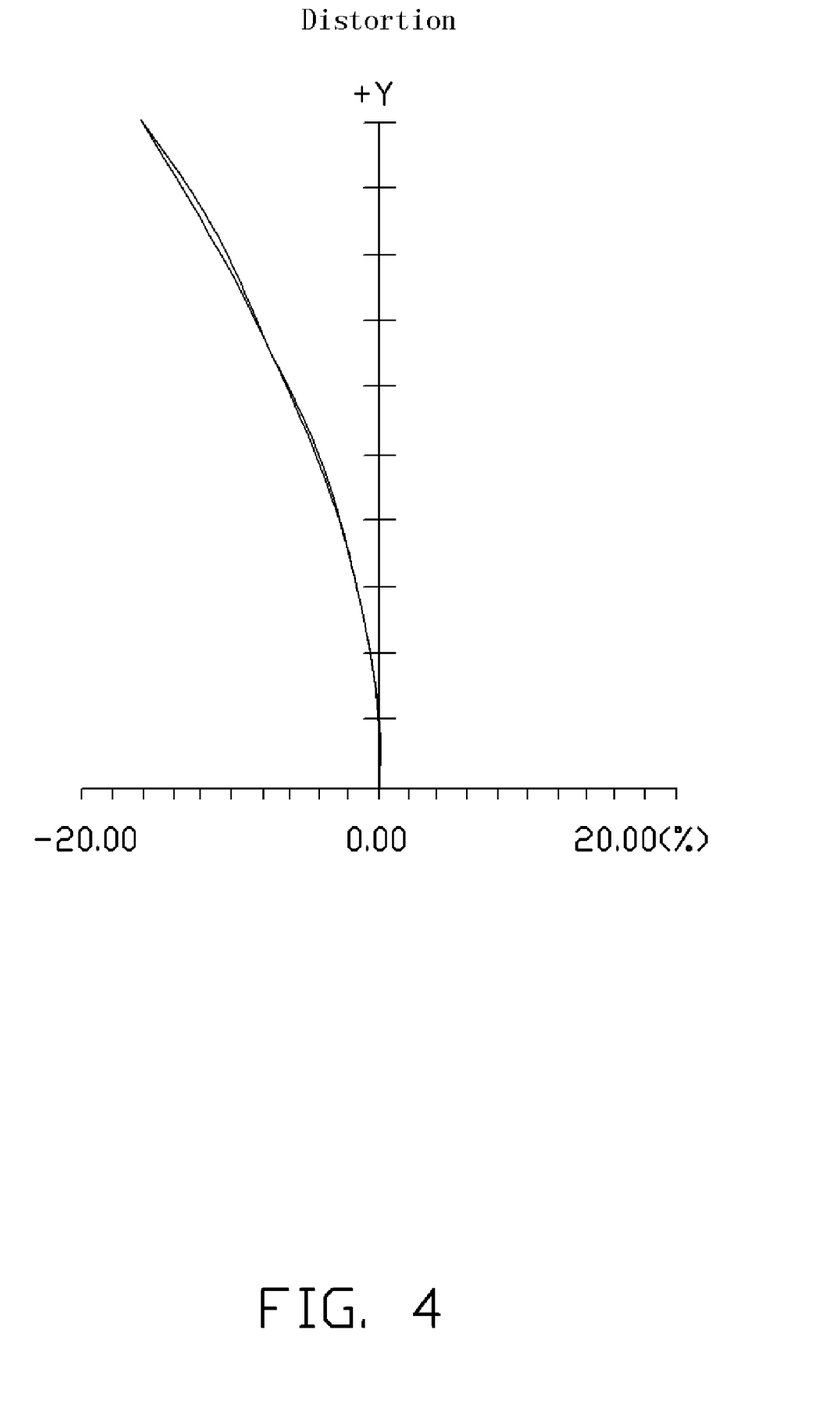

As illustrated in FIG. 2, the curves F, d, and C are respective spherical aberration characteristic curves of F light (wavelength: 486.1 nm), d light (wavelength: 587.6 nm), and C light (wavelength: 656.3 nm) occurring in a wide angle state. Obviously, spherical aberration of visible light (400-700 nm) occurring in the wide angle state is in a range of: −0.2 mm~0.2 mm. In FIG. 3, the curves T and S are the tangential field curvature curve and the sagittal field curvature curve in the wide angle state, respectively. Clearly, field curvature occurring in the zoom lens system 100 of the first embodiment is limited to a range of: 0~0.2 mm. In FIG. 4, distortion occurring in the wide angle state is limited within the range of: −20%~0.

Figure 5:
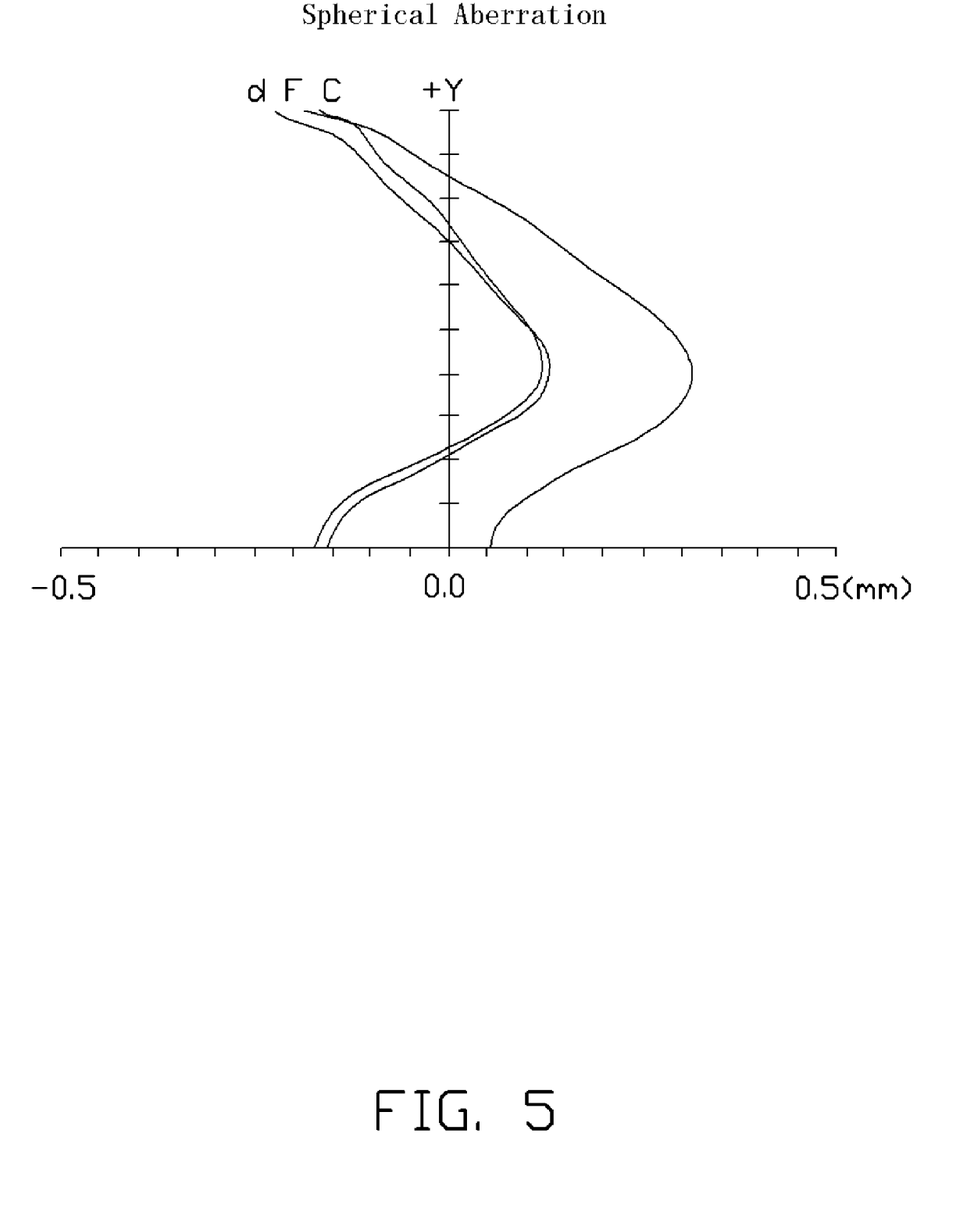
FIGS. 5-7 are graphs respectively showing spherical aberration, field curvature, and distortion in the zoom lens system of FIG. 1 in a telephoto state.
Figure 6:
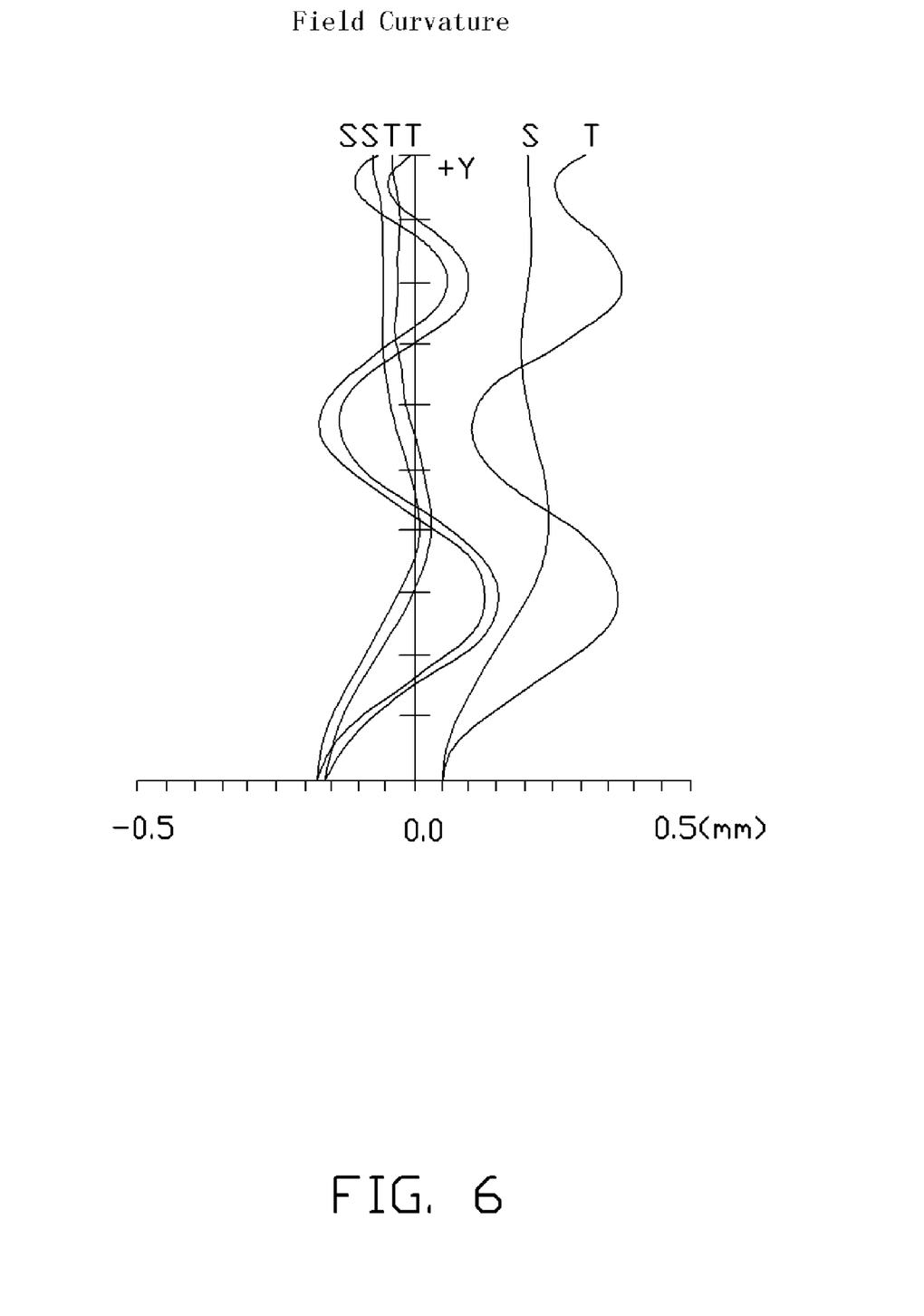
Figure 7:
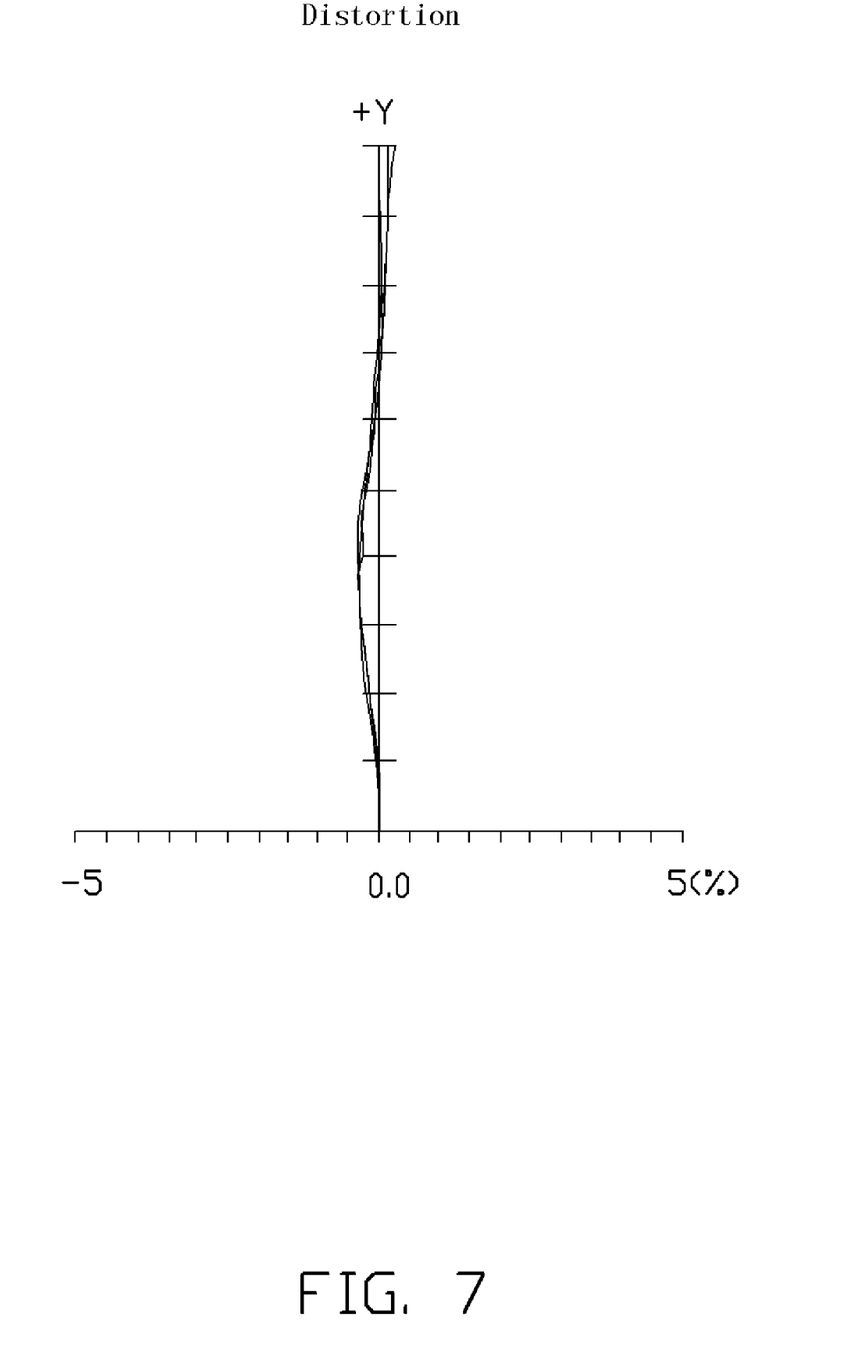

As illustrated in FIG. 5, the spherical aberration of visible light (400-700 nm) occurring in a telephoto state is in a range of: −0.5 mm~0.5 mm. In FIG. 6, the field curvature occurring in the telephoto state is limited to a range of: −0.5 mm~0.5 mm. In FIG. 7, distortion occurring in the telephoto state is limited within the range of: −1%~1%.

Figure 8:
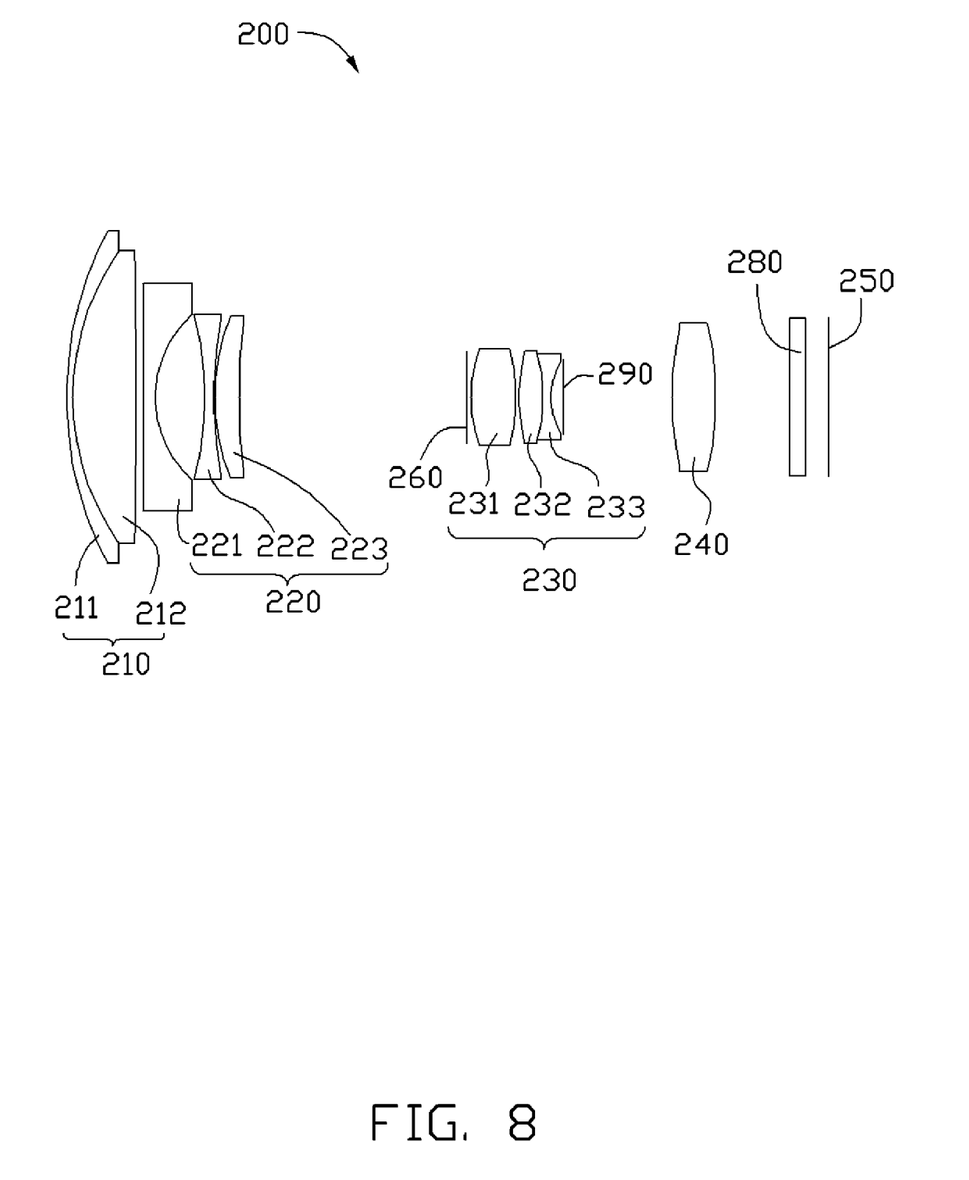
FIG. 8 is a schematic view of a zoom lens system in accordance with a second embodiment.

Referring to FIG. 8, a second embodiment of a zoom lens system 200 includes, in order from the subject to the image side thereof, a first, second, third, fourth lens group 210, 220, 230, 240, and an image plane 250. The first lens group 210 includes a first lens 211 and a second lens 212 arranged from the subject side to the image side of the zoom lens system 200.

The first lens and the second lens 211, 212 are adhered together to form a compound lens. The second lens group 220 includes a third lens 221, a fourth lens 222, and a fifth lens 223. The fourth lens group 240 includes an eighth lens. The zoom lens system 200 further includes an aperture stop 260 between the second and third lens group 220, 230, and a infrared cut filter 280 on the subject side of the image plane 250. The configuration of the first, second, and fourth lens group 210, 220, 240 in the second embodiment are the same as that of the first, second, and fourth lens group 10, 20, 40 in the first embodiment. A subject side surface of the second lens 212 is aspherical surface.

The difference between the first and second embodiments is: the third lens group 230 includes, from the subject side to the image side of the zoom lens system 200, a sixth lens 231, a seventh lens 232, and a ninth lens 233. The seventh lens 232 and the ninth lens 233 are adhered together to form a compound lens. A subject side surface and an image side surface of the sixth lens 231 are aspherical surfaces. The zoom lens system 200 further includes a shielding plate 290 used for shielding the wide-angle light rays from the third lend group 230 to the fourth lens group 240. In this embodiment, L3=−14.082 mm, Lt=59.889 mm, |L3|/Lt=0.235, f3=9.935 mm, ft=57.883 mm, f3/ft=0.172, Lw=37.029 mm, fw=5.137 mm, (Lw×Lt)/(fw×ft)=7.458.

Referring to FIGS. 6-10, a zoom lens system 200, according to the second embodiment, satisfies tables 5-8.

TABLE 5

| Surface | R(mm) | D(mm) | Nd | Vd |
|---|---|---|---|---|
| Subject side surface of the first lens 211 | 17.449 | 0.3 | 2.001 | 29.135 |
| Image side surface of the first lens 211 (Subject side surface of the second lens 212) | 12.26 | 3.075 | 1.623 | 58.164 |
| Image side surface of the second lens 212 | −263.035 | D3 | — | — |
| Subject side surface of the third lens 221 | −401.457 | 0.536 | 1.788 | 47.49 |
| Image side surface of the third lens 221 | 5.4346 | 2.4 | — | — |
| Subject side surface of the fourth lens 222 | −16.331 | 0.46 | 1.7015 | 41.149 |
| Image side surface of the fourth lens 222 | 22.363 | 0.05 | — | — |
| Subject side surface of the fifth lens 223 | 10.614 | 1.153 | 2.0027 | 19.317 |
| Image side surface of the fifth lens 223 | 33.31 | D9 | — | — |
| Aperture stop 260 | infinity | 0.22 | — | — |
| Subject side surface of the sixth lens 231 | 5.727 | 2.17 | 1.531 | 55.75 |
| Image side surface of the sixth lens 231 | −11.083 | 0.153 | — | — |
| Subject side surface of the seventh lens 232 | 8.822 | 1.173 | 1.9108 | 35.25 |
| Image side surface of the seventh lens 232 | −8.275 | D14 | 1.7552 | 27.53 |
| Subject side surface of the ninth lens 233 | 3.69 | 22.324 | — | — |
| Image side surface of the ninth lens 233 | 15.605 | D16 | 1.497 | 81.6 |
| Subject side surface of the eighth lens | −15.671 | 0.959 | — | — |
| Image side surface of the eighth lens | infinity | 0.8 | 1.516 | 64.1 |
| Subject side surface of the filter 280 | infinity | 1.1 | — | — |
| Image side surface of the filter 280 | infinity | — | — | — |
| Image plane 250 | infinity | — | — | — |

TABLE 6

| Surface | Aspherical coefficient |
|---|---|
| Subject side surface of the second lens 212 | K = 15.435; A4 = 1.664944e−005; A6 = −2.08191e−006; A8 = 1.67494e−007; A10 = −7.54675e−009; A12 = 1.914270e−010; A14 = −2.55736e−012; A16 = 1.398639e−014 |
| Subject side surface of the sixth lens 231 | K = −0.53; A4 = −1.75224e−003; A6 = 1.212351e−004; A8 = −5.17167e−005; A10 = −4.73567e−006; A12 = 3.952987e−006; A14 = −6.67538e−007; A16 = 3.725084e−008 |
| Image side surface of the sixth lens 231 | K = −20.9017; A4 = −2.26854e−003; A6 = −3.81776e−005; A8 = 7.745020e−005; A10 = −4.14617e−005; A12 = 9.583939e−006; A14 = −1.09424e−006; A16 = 4.922213e−008 |

TABLE 7

| | D3 | D9 | D14 | D16 |
|---|---|---|---|---|
| Wide angle state | 0.4 | 11.047 | 5.876 | 3.583 |
| Telephoto state | 19.57 | 0.656 | 22.324 | 0.96 |

TABLE 8

| | f(mm) | F/No | 2ω |
|---|---|---|---|
| Wide angle state | 5.145 | 2.96 | 74.25 |
| Telephoto state | 57.873 | 6.06 | 7.6 |

Figure 9:
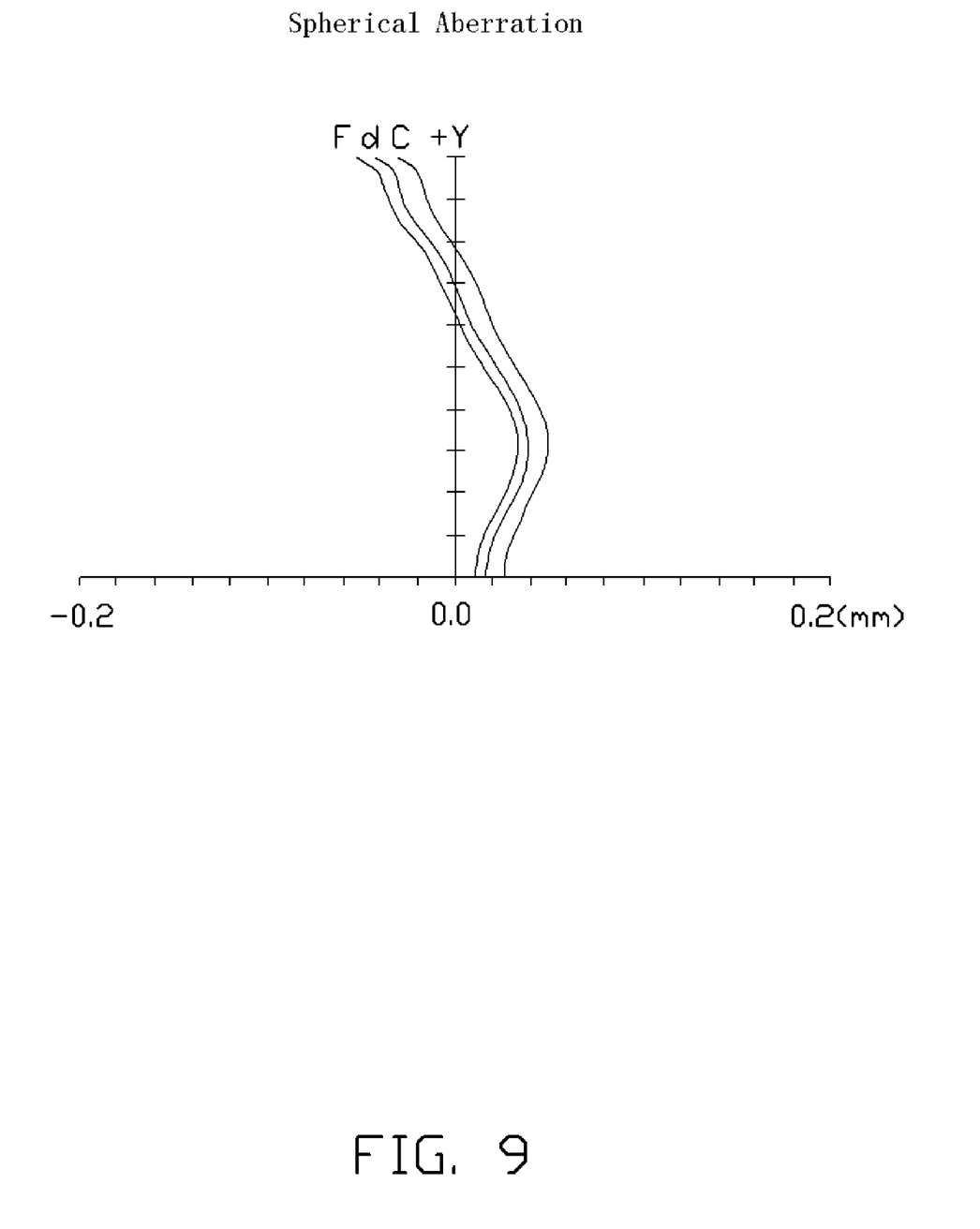
FIGS. 9-11 are graphs respectively showing spherical aberration, field curvature, and distortion occurring in the zoom lens system of FIG. 8 in a wide angle state.
Figure 10:
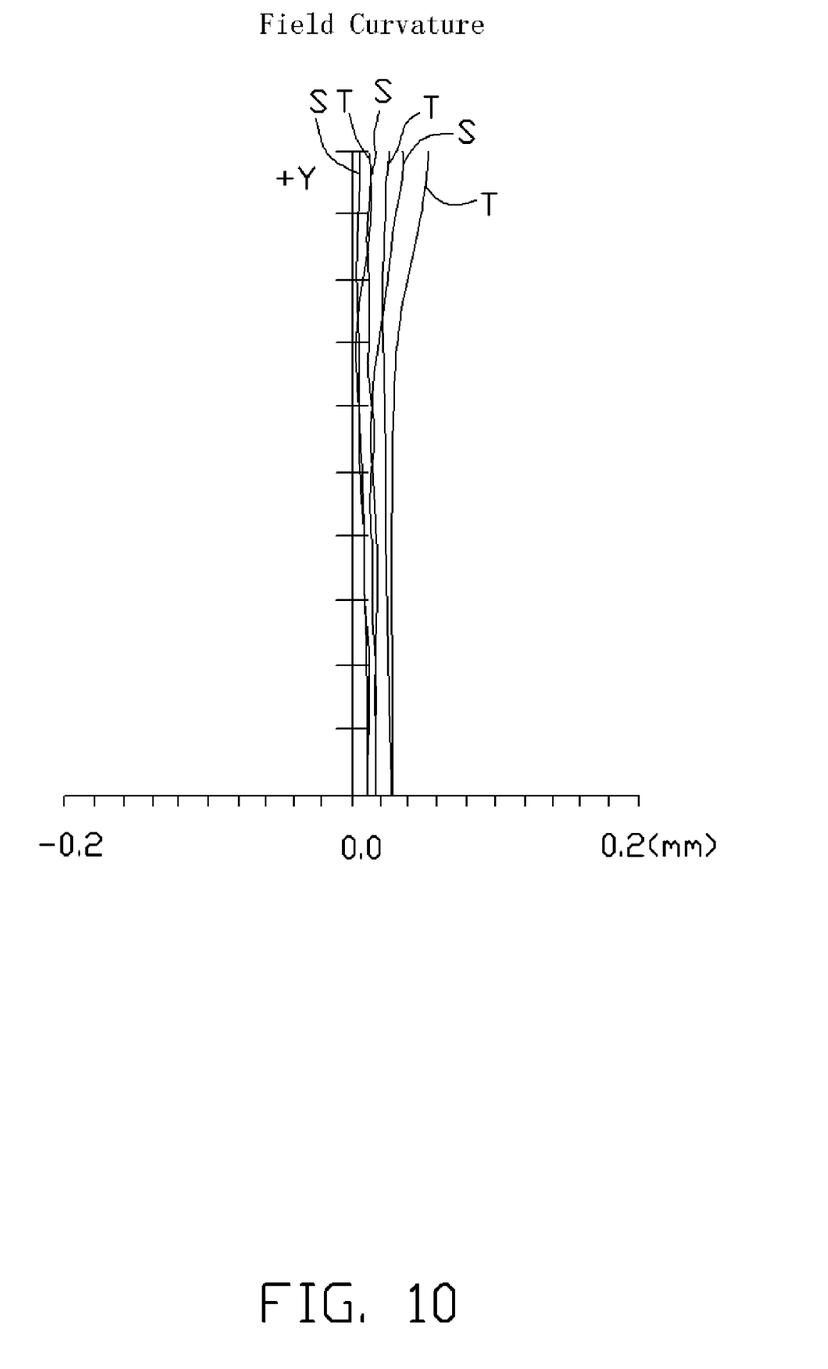
Figure 11:
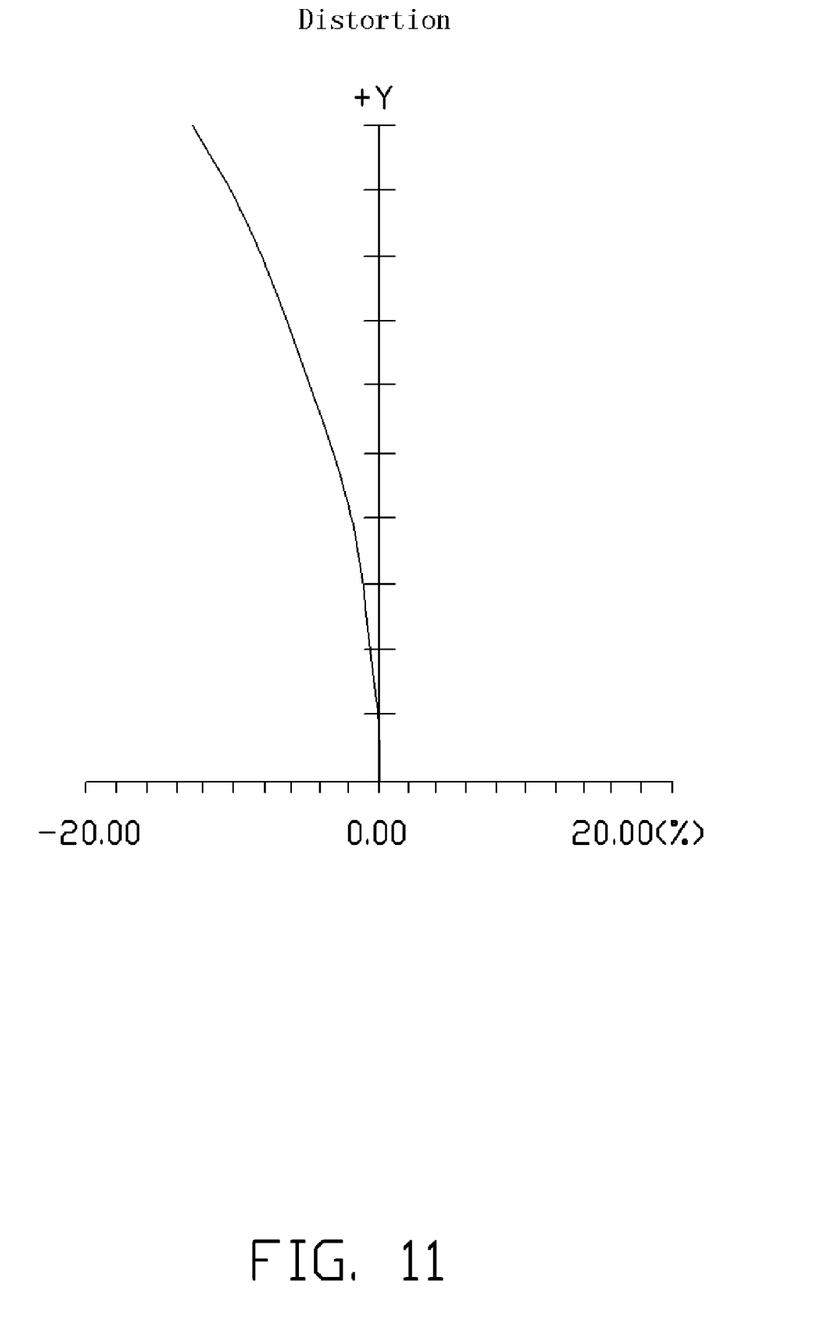

As illustrated in FIG. 9, the curves F, d, and C are respective spherical aberration characteristic curves of F light (wavelength: 486.1 nm), d light (wavelength: 587.6 nm), and C light (wavelength: 656.3 nm) occurring in a wide angle state. Obviously, spherical aberration of visible light (400-700 nm) occurring in the wide angle state is in a range of: −0.2 mm~0.2 mm. In FIG. 10, the curves T and S are the tangential field curvature curve and the sagittal field curvature curve in the wide angle state, respectively. Clearly, field curvature occurring in the wide angle state is limited to a range of: 0~0.2 mm. In FIG. 11, distortion occurring in the wide angle state is limited within the range of: −20%~0.

Figure 12:
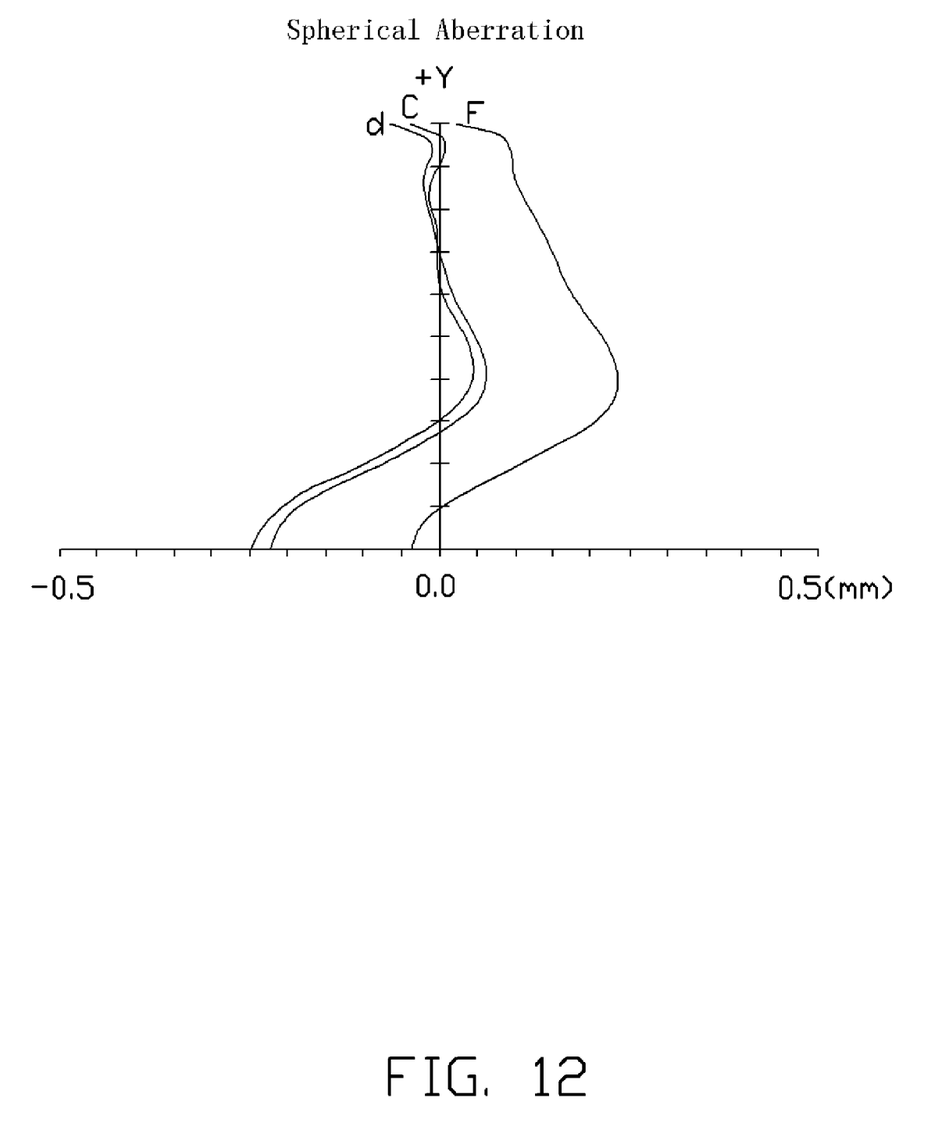
FIGS. 12-14 are graphs respectively showing spherical aberration, field curvature, and distortion occurring in the zoom lens system of FIG. 8 in a telephoto state.
Figure 13:
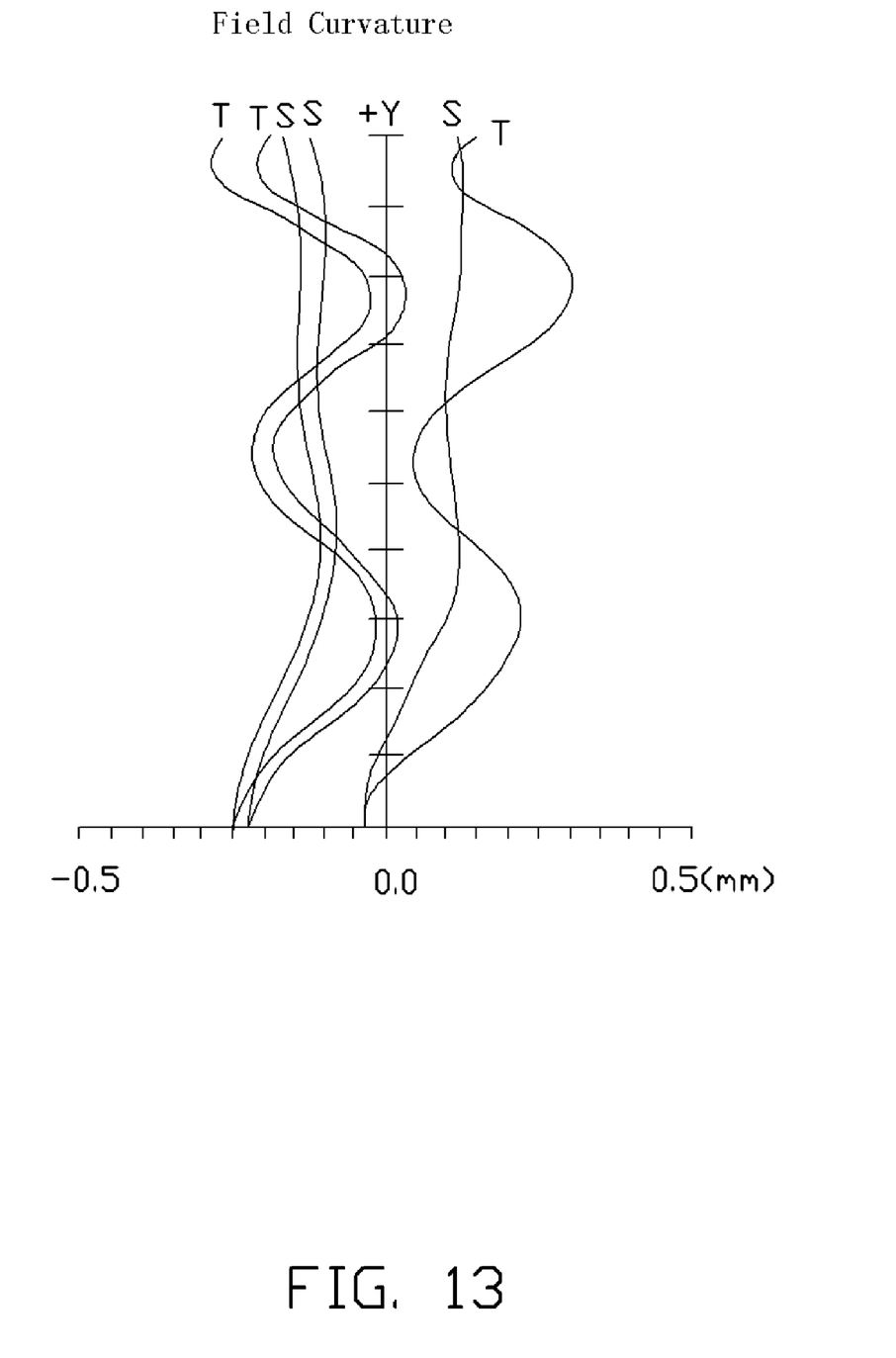
Figure 14:
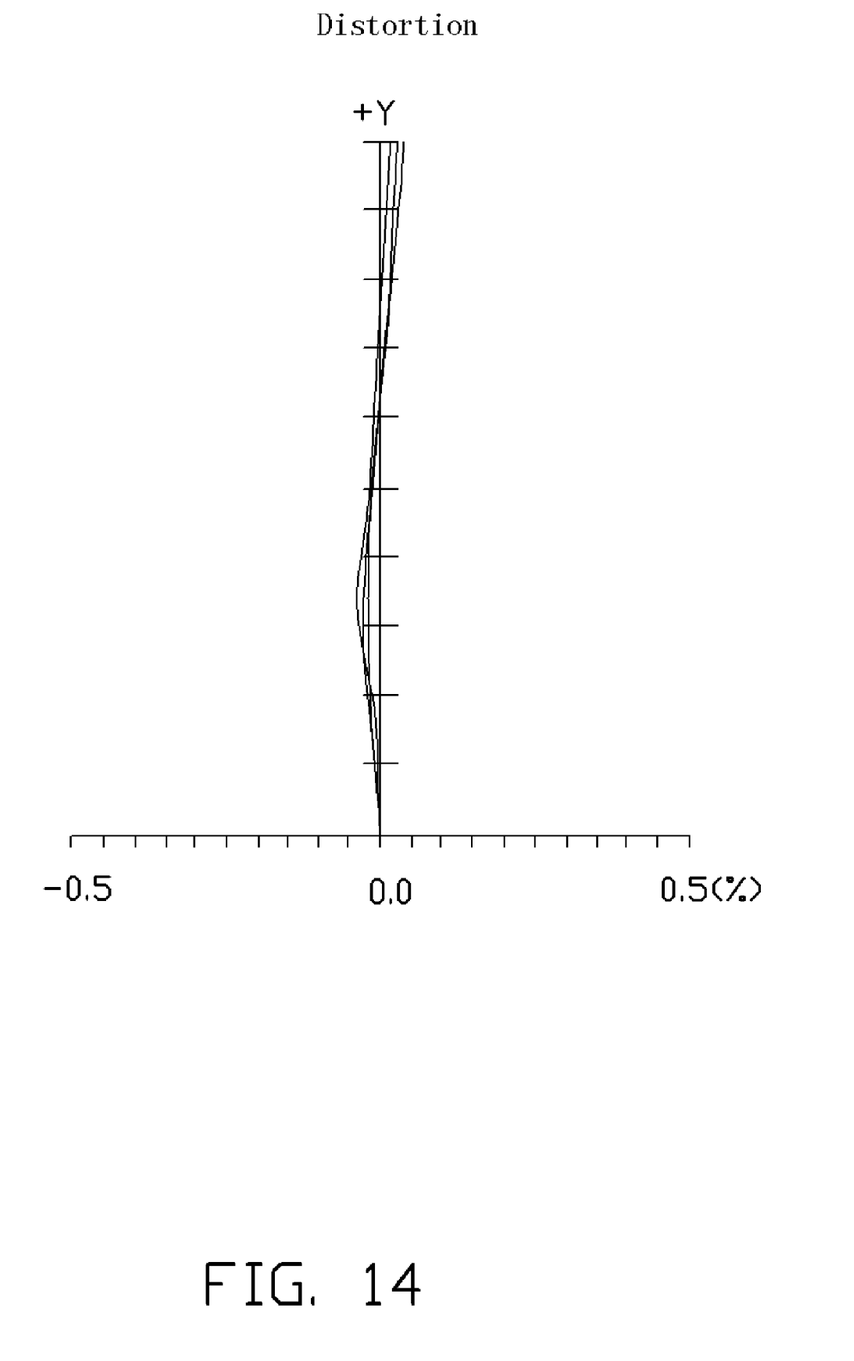

As illustrated in FIG. 12, the spherical aberration of visible light (400-700 nm) occurring in a telephoto state is in a range of: −0.5 mm~0.5 mm. In FIG. 13, the field curvature occurring in the telephoto state is limited to a range of: −0.5 mm~0.5 mm. In FIG. 14, distortion occurring in the telephoto state is limited within the range of: −1%~1%.

It will be understood that the above particular embodiments are shown and described by way of illustration only. The principles and the features of the present disclosure may be employed in various and numerous embodiment thereof without departing from the scope of the disclosure as claimed.

The above-described embodiments illustrate the scope of the disclosure but do not restrict the scope of the disclosure.

What is claimed is:

1. A zoom lens system, in order from the subject side to the image side thereof, comprising:
    a first lens group with positive refractive power;
    a second lens group with negative refractive power;
    a third lens group with positive refractive power; and
    a fourth lens group with positive refractive power;
    wherein the first, second, third and fourth lens groups are capable of moving along the optical axis of the zoom lens system;
    wherein the zoom lens system satisfies the following formula: $0.15<|L3|/Lt<0.25$, where L3 is a movement vector of the third lens group during the zoom lens system moves from a wide-angle state to a telephoto state, the movement vector of the third lens group is a positive value when the third lens group moves from the subject side to the image side, the movement vector of the third lens group is a negative value when the third lens group moves from the image side to the subject side, Lt is the total length of the zoom lens system along the optical axis in the telephoto state;
    wherein the zoom lens system satisfies the following formula: $0.15<f3/ft<0.2$, wherein f3 is the effective focal length of the third lens group, ft is the effective focal length of the zoom lens system in the telephoto state.

2. The zoom lens system of claim 1, further satisfying the formula: $7.2<(Lw\times Lt)/(fw\times ft)<7.8$, where Lw is the overall length of the zoom lens system in the wide-angle state, fw is the effective focal length of the zoom lens system in the wide-angle state.

3. The zoom lens system of claim 1, wherein the first lens group comprises, in order from the subject side to the image side of the zoom lens system, a first lens of negative refractive power and a second lens of positive refractive power, the first lens and the second lens are adhered together to form a compound lens.

4. The zoom lens system of claim 1, wherein the second lens group comprises, in order from the subject side to the image side of the zoom lens system, a third lens of negative refractive power, a fourth lens of negative refractive power, and a fifth lens of positive refractive power.

5. The zoom lens system of claim 1, wherein the third lens group comprises, in order from the subject side to the image side of the zoom lens system, a sixth lens of positive refractive power and a seventh lens of negative refractive power.

6. The zoom lens system of claim 1, wherein the fourth lens group comprises an eighth lens of positive refractive power.

7. The zoom lens system of claim 1, wherein the third lens group comprises, from the subject side to the image side of the zoom lens system, a sixth lens, a seventh lens, and a ninth lens; the seventh lens and the ninth lens are adhered together to form a compound lens.

8. The zoom lens system of claim 7, wherein the zoom lens system further comprises a shielding plate positioned between the third and fourth lens groups, the shielding plate is configured for shielding wide-angle light rays from the third lens group to the fourth lens group.

9. The zoom lens system of claim 1, wherein the zoom lens further comprises an aperture stop positioned between the second lens group and the third lens group.

* * * * *